Jan. 19, 1932.　　A. C. BECKER　　1,842,062
GAS HEATED UTENSIL
Filed Oct. 22, 1928　　4 Sheets-Sheet 1

Jan. 19, 1932.  A. C. BECKER  1,842,062
GAS HEATED UTENSIL
Filed Oct. 22, 1928   4 Sheets-Sheet 2

Inventor:
Alfred Curt Becker
by
Lotka, Kohlenberg & Farley
Attorneys

Jan. 19, 1932.  A. C. BECKER  1,842,062
GAS HEATED UTENSIL
Filed Oct. 22, 1928  4 Sheets-Sheet 3
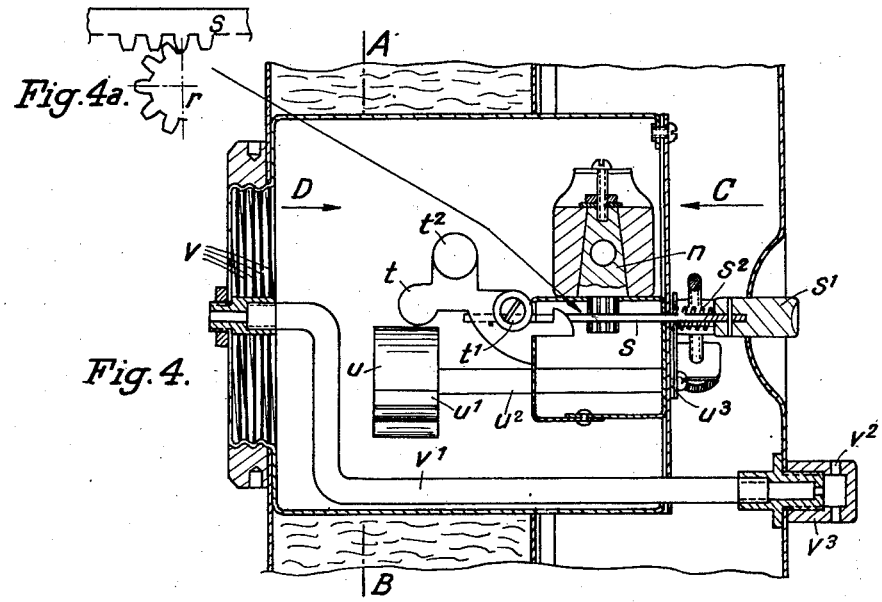
Fig.4a.
Fig.4.
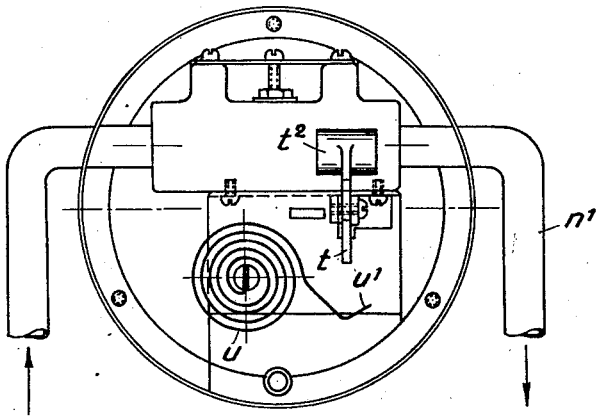
Fig.5.
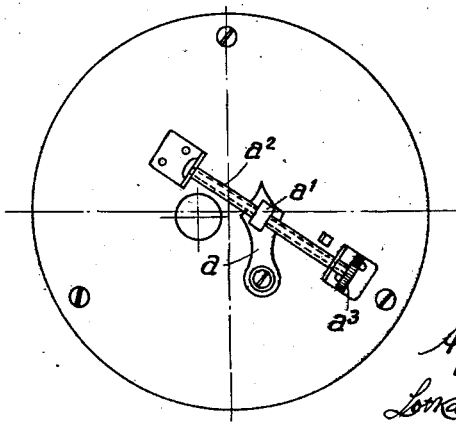
Fig.6.
Inventor:
Alfred Curt Becker
by
Lotka, Kehlenbeck & Farley
Attorneys.

Jan. 19, 1932.  A. C. BECKER  1,842,062
GAS HEATED UTENSIL
Filed Oct. 22, 1928  4 Sheets-Sheet 4
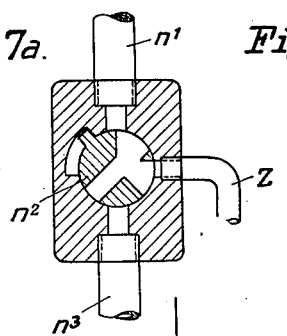
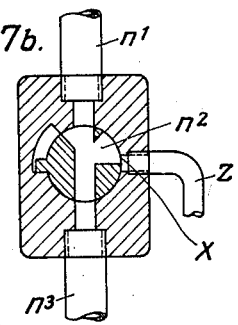
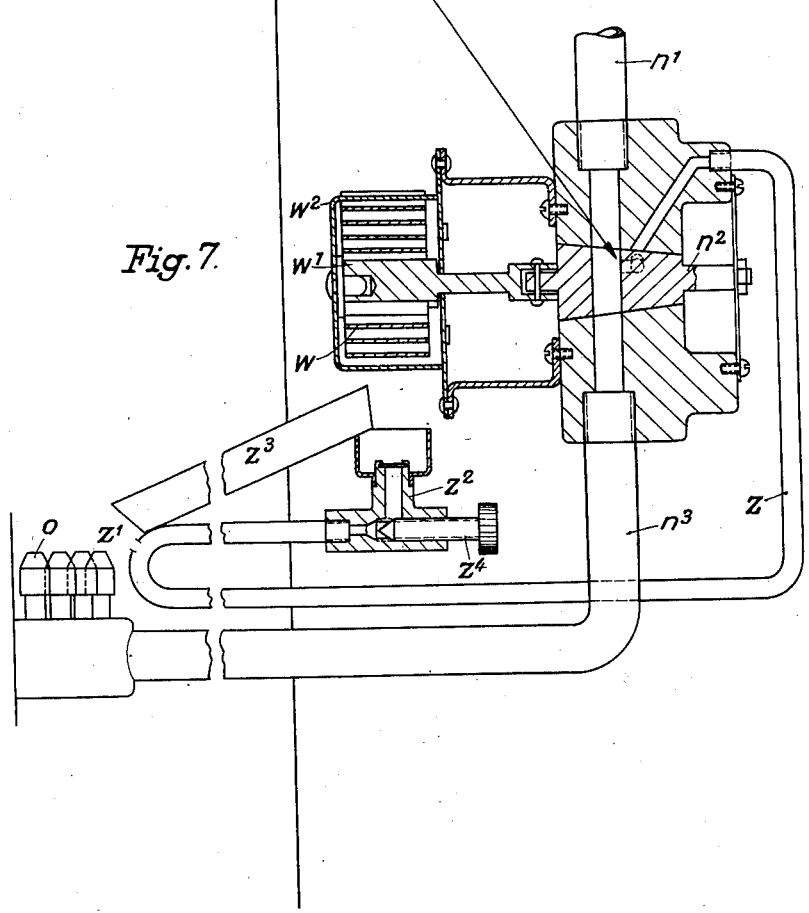
Inventor:
Alfred Curt Becker
by
Lotka, Kehlenbeck & Farley
Attorneys.

Patented Jan. 19, 1932

1,842,062

UNITED STATES PATENT OFFICE

ALFRED CURT BECKER, OF OBERSCHONEWEIDE, NEAR BERLIN, GERMANY

GAS HEATED UTENSIL

Application filed October 22, 1928, Serial No. 314,056, and in Germany October 26, 1927.

The invention relates to a gas-heated utensil and consists, on the one hand, therein, that this utensil has been equipped with an interrupting device which automatically cuts off the supply of gas to the burner after attaining a certain degree of heat within the insulated space.

It consists, on the other hand, therein, that a device is provided which is capable of being opened by a flame which simultaneously guarantees the ignition of the gas escaping from the burner.

Finally the invention consists in the suitable design of these devices, as well as in the utensil as such.

In the drawings the invention has been represented by way of example in which

Fig. 1 shows a section through a utensil in front-view in accordance with the invention, Fig. 2 represents a lateral or side view of the utensil (partly in section), Fig. 3 is a plan-view (partly in section in the direction A, B of Fig. 2), Fig. 4 is a switching-device with heat releaser in accordance with the invention, in section, Fig. 4a represents a detail of a rack and pinion shown in Fig. 4, Fig. 5 shows a view of the switching-device in the direction D, Fig. 4.

Fig. 6 illustrates a view of the switching-device from the direction C, Fig. 4.

Fig. 7 represents a gas-switching-and ignition-device in section in accordance with the invention, Figs. 7a and 7b each show a section through a gas-cock in open and in closed condition.

Figure 1:
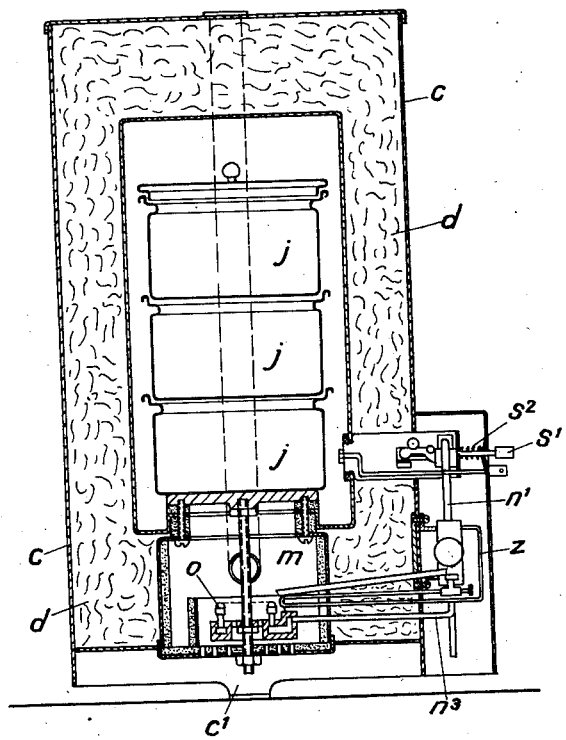
Figure 2:
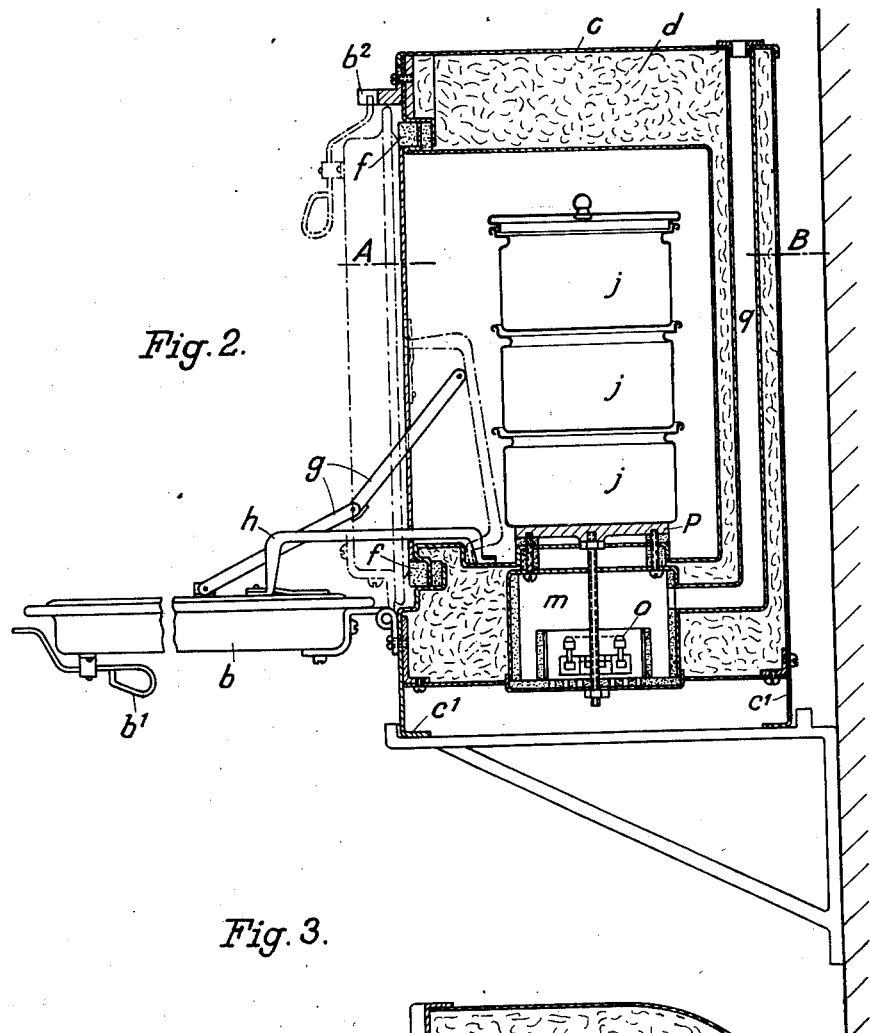
Figure 3:
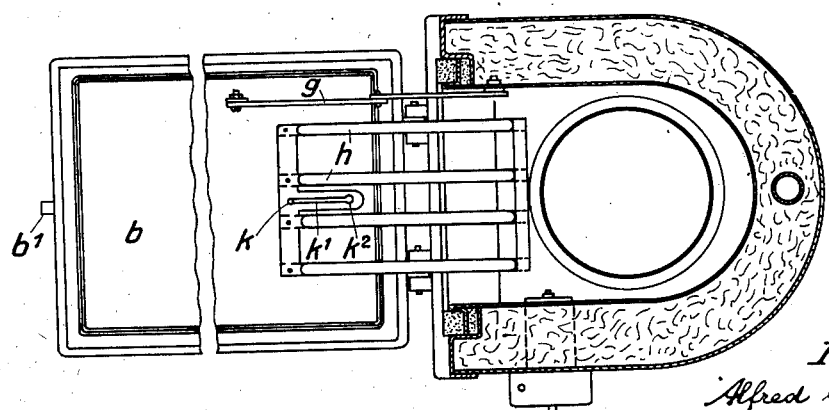

The drawings (Figs. 1–3) represent an economic cooking-utensil which has been designed to resemble a box or case and permits of being closed by means of a door $b$. The utensil is supported by feet $c^1$ consisting of sheet-metal which form a whole together with the walls $c$. The walls $c$ of the utensil are made to consist of sheet-metal, the inside surface of which have been lined with materials $d$ possessing bad heat conducting properties. The door $b$ may be closed and rendered heat-proof with the aid of the latch $b^1$ and an eye $b^2$. For this purose the doorframe has been provided with bad heat-conductors. When being opened the door $b$ is supported in a horizontal position by a collapsible system of rods $g$. The door has, moreover, been provided with a grill $h$ which is intended to facilitate the removal of the cooking-vessels from the utensil. This grill $h$ is of such construction that, when closing the utensil it may be suspended from the inside of the door $b$ beside the superposed cooking-vessels. The grill may also be detached from the door $b$, where it has been attached to the button $k$ and permits of being displaced longitudinally by means of the slot $k^1$. To this end the slot $k^1$ is provided at one end with an enlargement $k^2$ which is of somewhat larger dimensions than the button $k$. This renders possible an easy and convenient cleaning of the grill.

The economic cooking utensil possesses a heating chamber $m$ within which the burners $o$ have been installed. This heating chamber is closed in an upward direction by means of the plate $p$ which simultaneously furnishes the support for the cooking-vessels $i$. The heating-chamber $m$ communicates with the atmosphere by means of an escape $q$ for waste-gases. This waste-gas outlet has, as well as the interior of the cooking utensil been lined with sheet-metal.

At the side of the utensil a switching device with heat-releaser has been fitted in accordance with Fig. 4. This consists of a main gas-cock $n$ which permits of being moved by the joint-action of a pinion $r$ and a rack $s$ per Fig. 4a. If the press-button $s^1$, which is rigidly connected with the rack $s$, is pressed in, the main-cock $n$ will be opened as a result of this movement. The rack $s$ is now held in its position by a latch $t$ loaded with weight $t^2$ said latch permitting of being swung round a point $t^1$. $u$ is a spiral-shaped bi-metal spring which has been attached to its spindle $u^2$. An increasing temperature will cause the spring $u$ to curl up and to catch with its end $u^1$ the latch $t$ in such a manner, that the latter is swung round the point $t^1$, causing the latch to be lifted up. A spring $s^2$ will now cause the rack to be returned to its original position, whereby the main gas-cock $n$ will be closed. The whole of the enclosed space, within which this device has been installed communicates with the interior of the cooking-utensil by means of thin sheet-metal partitions $v$ of heat conducting properties which, by way of example, as per the drawing Fig. 4, act as heat-condensers. Through the switching-space of the heat-releaser a tube $v^1$ has, moreover been made to pass which causes the interior of the utensil to communicate with the atmosphere. This tube-conduit $v^1$ is intended to act as safety-valve in case of possible break-downs. The heat releasing device described above is to cut off the gas-supply, as soon as the goods being cooked, have attained a certain temperature, say 100°. If now the device does not cut off the gas-supply at this point, this will be rendered noticeable by the escape of steam from the openings $v^2$ of the tube-cap $v^3$.

Viewed in direction C of the switching-device (Fig. 6) a device may be recognized which acts to regulate the time at which the cutting off of the gas-supply may be effected. The spindle $u^2$ has been extended to project beyond the utensil and is provided at its end $u^3$ with a pointer $a$. The pointer possesses a slot not drawn within which a pin, likewise not drawn, may be moved along. The pin is attached to a nut $a^1$ and movably disposed by turning the spindle $a^2$ with the aid of the milled disk $a^3$ by hand. This will cause the pointer to be swung round and with it the spindle $u^2$, as well as the spring $u$, whereby the way or the distance, which the end $u^1$ of the spring has to cover until releasing the latch $t$, may be altered. The pointer $a$ indicates upon a scale the releasing temperature prevailing at the time.

If the main-cock $n$ has been opened by pressing in the press-button $s^1$, the gas will be made to flow through the conduit $n^1$ to the gas-cock $n^2$, which is closed for the time being. It will, however, be seen from the Figs. 7a and 7b that its construction is such, that even when closed, it will allow gas to pass through the ignition-conduit $z$ to the opening for the ignition-flame $z^1$ and to the ignition burner $z^2$. If now the ignition-burner $z^2$ is lighted, the gas escaping at $z^1$ is conducted to the ignition-burner $z^2$ through the medium of the super-conduit $z^3$, where it is ignited. The flame lights back and also ignites the ignition-flame $z^1$. The ignition-burner $z^2$, the flame of which may be regulated through the milled screw $z^4$, now heats the spiral-shaped bi-metal spring $w$ which with its inner end has been attached to a spindle $w^1$ and with its outer end to its casing $w^2$. Owing to its being heated the bi-metal spring $w$ will be caused to expand, thereby turning the spindle $w^1$ being the only movable part, because the casing $w^2$ has been rigidly connected with the whole of the device. In view of the fact that the spindle $w^1$ is firmly connected with the plug of the gas-cock $n^2$, the latter will be opened. Gas will now also flow through the main-conduit $n^3$ to the burner $o$ where it is ignited by the ignition-flame $z^1$. If the gas-cock $n^2$ has been wholly opened, the gas-supply for the ignition-conduit $z$ will be throttled, as can be seen from Fig. 7b at the point $x$. The flame of the ignition-burner $z^2$ will thereby be rendered smaller, because it now has only to maintain the temperature of the bi-metal spring $w$ and not to increase it, because otherwise the spring $w$ might break or be prematurely fatigued.

If now the temperature adjusted upon by means of the regulating device, has been attained, the main gas-cock will be suddenly closed. This will cause all burners to be extinguished, the bi-metal-spring will grow cold again, contracts and thereby closes the gas-cock $n^2$.

I claim:—

1. In a cooking utensil with a space inclosed by insulated walls, a gas burner, a conduit for feeding the gas burner, a closing device within the conduit, at the closing-device a heat-switch which is suitable to open the closing device under the action of the heat, and being arranged exteriorly of said space, an ignition-flame conduit for said burner and in the ignition-flame conduit an outlet-passage exteriorly of said space and in such a position to the heat-switch, that the gas ignited here is suitable to heat the heat-switch and means, which are suitable to guarantee the lighting of the burner, when said flame is ignited.

2. In a cooking utensil in accordance with claim 1, a closed space to be heated and in front of the gas closing-device a second gas closing-device which is suitable to be opened by hand and upon attaining a certain heat within the said space to automatically actuate the closing-device.

3. In a cooking utensil in accordance with claim 1, in the gas closing-device a gas-cock which is suitable when being closed, to fully supply the ignition-conduit with gas and when in an open condition, to throttle the supply to the ignition-conduit.

4. In a cooking utensil in accordance with claim 1, in the ignition-conduit a second outlet-passage near the burner and means between the two outlet-passages which are suitable to ignite the gas escaping from the second passage, if the gas at the first outlet-passage is ignited.

5. In a cooking utensil in accordance with claim 1, a heat-switch consisting of a bi-metal spring.

In testimony whereof I affix my signature.

ALFRED CURT BECKER.